United States Patent [19]

Frazier

[11] 3,865,057

[45] Feb. 11, 1975

[54] APPARATUS FOR SUBSOIL IRRIGATION

[76] Inventor: Thomas J. Frazier, 2680 Ashford Rd., N.E., Atlanta, Ga. 30319

[22] Filed: Oct. 2, 1972

[21] Appl. No.: 294,220

Related U.S. Application Data

[63] Continuation-in-part of Ser. No. 159,223, July 2, 1971, Pat. No. 3,753,409.

[52] U.S. Cl. .................................... 111/7, 239/177
[51] Int. Cl. ............................................. A01c 23/02
[58] Field of Search ............ 111/7, 6; 239/183, 191, 239/195, 212, 587, 171, 177

[56] References Cited
UNITED STATES PATENTS

| | | | |
|---|---|---|---|
| 952,607 | 3/1910 | Coplen | 111/7 |
| 3,038,424 | 6/1962 | Johnson | 111/7 |
| 3,260,424 | 7/1966 | Mankin | 239/195 X |
| 3,295,482 | 1/1967 | Dountas | 111/7 |
| 3,413,940 | 12/1968 | Vissers | 111/7 |
| 3,507,336 | 4/1970 | Nelson | 239/183 X |
| 3,518,953 | 7/1970 | Johnston | 111/7 |
| 3,648,930 | 3/1972 | Brown et al. | 239/177 |

Primary Examiner—Stephen C. Pellegrino
Attorney, Agent, or Firm—Newton, Hopkins & Ormsby

[57] ABSTRACT

An apparatus for subsoil application of fluid soil conditioning medium, such as water, for use in subsoil irrigation. The system of subsoil irrigation or application of a fluid soil conditioning medium includes a stationary supply source, such as a well, with the well being operatively connected through reelable conduit means to an intermediate reel means supported on a translatable vehicle means and with the conduit means including an additional conduit portion operatively connected to the translatable fluid application means. The translatable fluid application means includes a plurality of horizontally spaced soil splitting shank means for openings in the soil of the area being traversed and further includes pressure pumping means for applying the fluid delivered thereto through the openings in the soil to the subsoil of the area.

12 Claims, 13 Drawing Figures

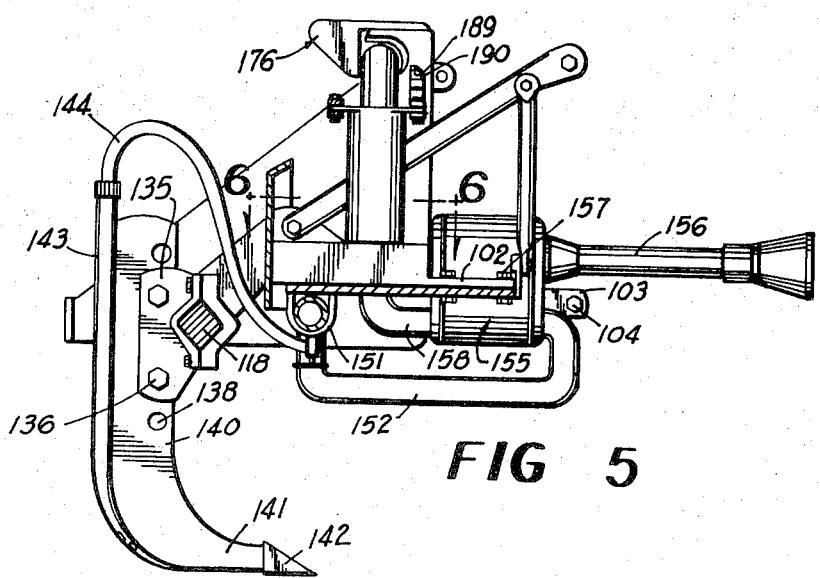
FIG 5
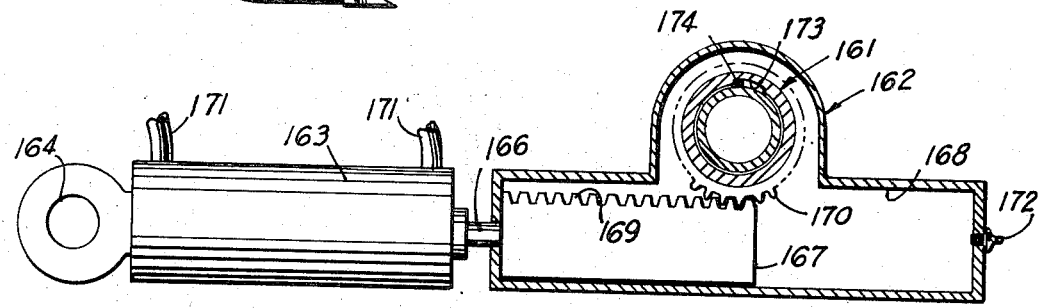
FIG 6
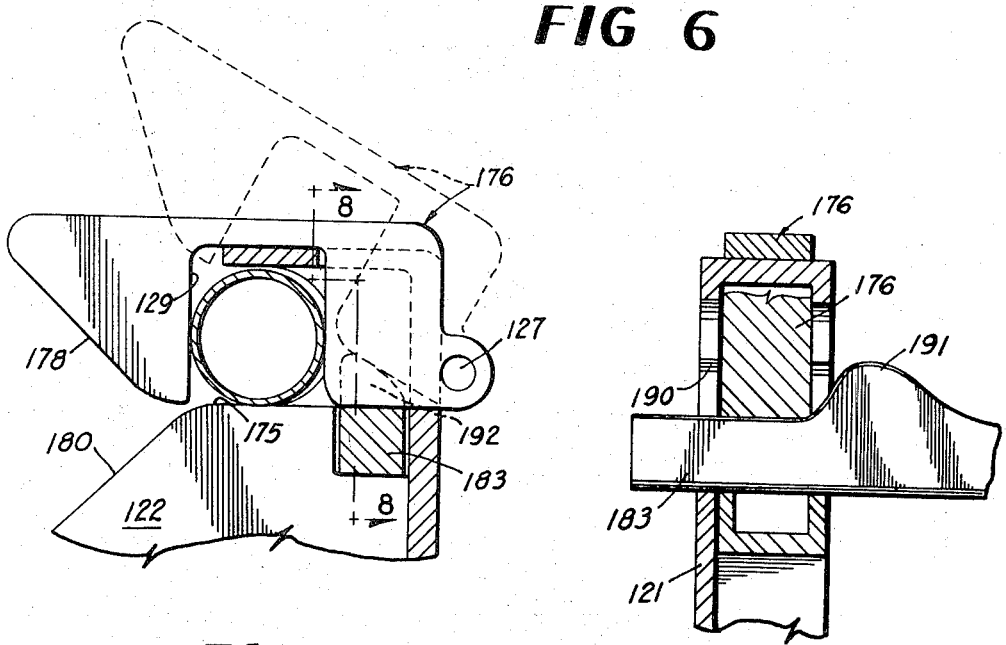
FIG 7
FIG 8

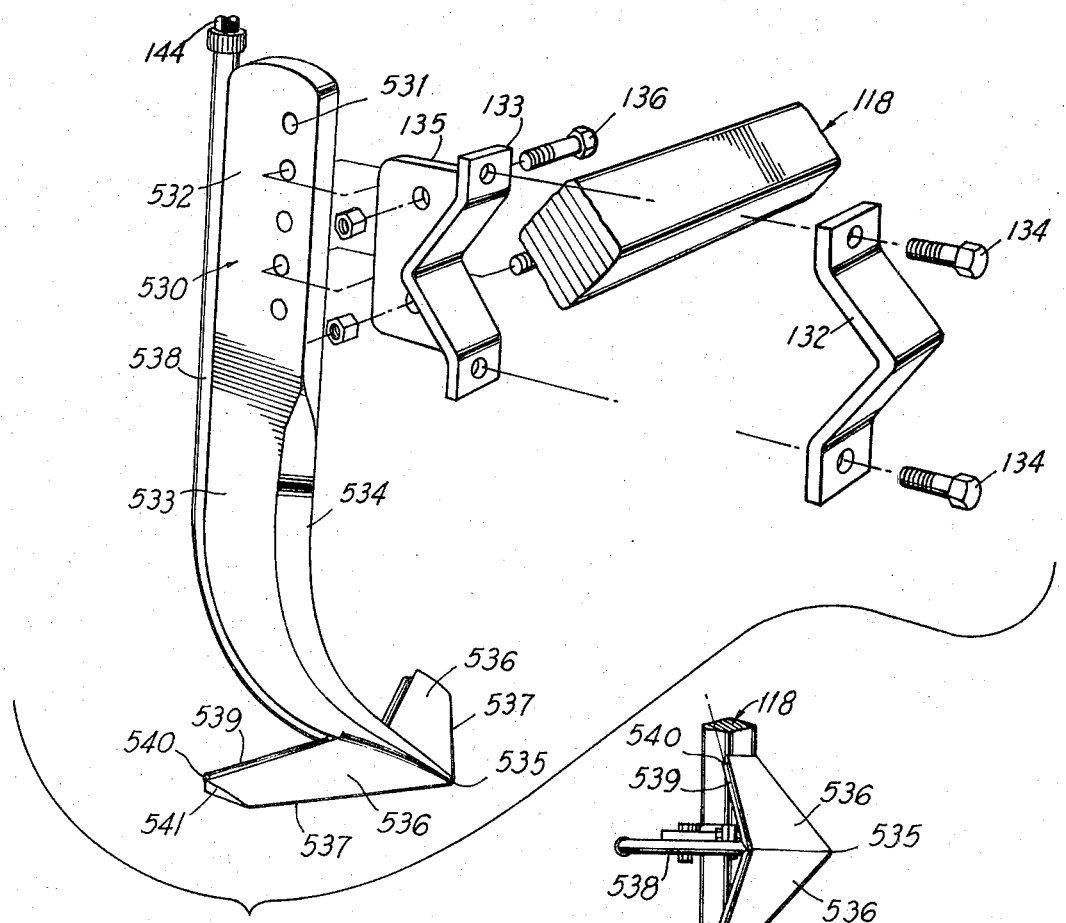
FIG 10    FIG 13
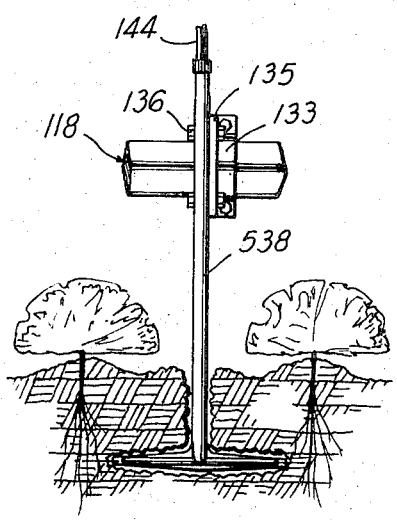
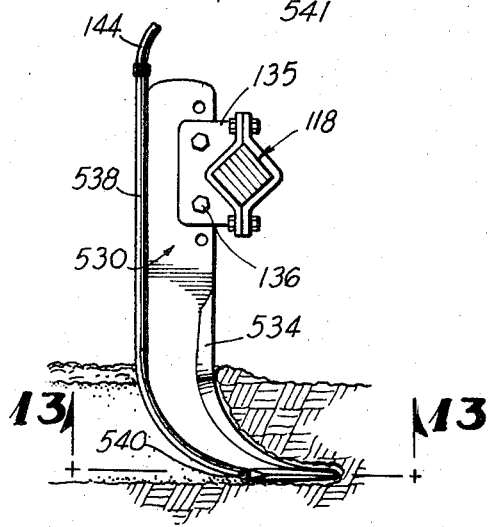
FIG 11    FIG 12

APPARATUS FOR SUBSOIL IRRIGATION

REFERENCE TO COPENDING APPLICATION

This is a continuation-in-part of my copending application, Ser. No. 159,223, now U.S. Pat. No. 3,753,409, filed July 2, 1971.

BACKGROUND OF THE INVENTION

This invention relates to an apparatus for the subsoil application of a fluid soil conditioning medium. More particularly, this invention is directed to an apparatus for the subsoil irrigation of a given area through the progressive manipulation of translatable vehicle means while simultaneously transferring water used for irrigation from a stationary supply source to the translatable vehicle means used for the subsoil application of the water.

In the southwestern United States and other similar regions, adequate irrigation of the soil has been an age old problem not heretofore completely solved by known methods. In hot, arid regions, above-ground sprinkling and spraying of the soil is almost useless due to rapid evaporation, and ditch irrigation is usually not practical due to the unavailability of sufficiently large sources of water for this method.

If you asked an agricultural engineer to describe the perfect irrigation system, he would probably include these features: it would have to be low in cost, long life, minimum of labor requirements, and the capacity of operate from less than ideal water sources. There would be no pipes to move. Evaporation losses would be small, and you could get the right amount of water to the crops just at the right time.

The perfect irrigation system as described above has not been constructed yet. Of course, many attempts have been made to provide effective irrigation means which would suit particular needs of certain crops and suitable for certain terrain characteristics and water supply sources.

Probably the first attempt at irrigation was to flood an area to be irrigated with water conveyed thereto by gravity from a water supply source, such as rivers or lakes. In some areas, a water supply source was not available and in these areas special canals have been constructed for use in conveying water from remote rivers and lakes. Special conduit means have been developed for transferring water from a canal to an area to be flooded. In the continued development of irrigation, especially suitable for row crops, the row crops were cultivated in such a manner that would allow water to flow along a small canal between adjacent rows. To convey water along canals between adjacent rows required that the terrain be almost level and that the canals be carefully constructed between these rows to allow effective flow of water therealong. Each of the above indicated methods of flooding an area either completely, or by row, for irrigation purposes is often not feasible in certain areas due to the terrain characteristics which would not permit such flooding irrigation and due to the extreme amounts of water required. The use of flooding irrigation methods described above permits considerable loss of water through evaporation.

In a continued development of irrigation, lightweight pipe conduit means have been developed which will effectively convey water from a water supply source, either lakes, canals or a well means. Sprinkler means are operatively associated with the pipe conveying means for spraying water outwardly over a predetermined area relative to the conduit means. A number of sprinkler means would be located along the conduit means to completely cover a given area in a sprinkling operation. After a first area has been covered with water in a sprinkler irrigation system, the pipes and sprinkler means would be disassembled and moved to an adjacent area whereby the water could be applied thereto. This method of disassembling and moving the pipes would be repeated until the desired area has been completely covered with the desired amount of water for irrigation purposes. The use of movable conduit means with sprinkler means is expensive, time consuming and often results in damage to the crops to which the water is to be applied.

Some attempts have been made to support the conduit means and sprinkler means on a translatable supporting rig which could automatically move over a predetermined area and sprinkle water on the area during the translating movement. However, these support rigs are extremely complex in construction, expensive to manufacture and are limited in their operation to level terrain. Further, the use of a sprinkler irrigation system requires extreme amounts of water due to evaporation losses.

Some attempts have been made to provide subsoil irrigation since subsoil irrigation would eliminate evaporation losses, thereby reducing the water requirements for use in irrigation. The prior art subsoil irrigation methods have utilized plastic pipe means buried underground with the plastic pipe means having a plurality of small openings extending along the length of the pipe. Irrigation is effected by pumping water under pressure through the buried pipe means, which water will be ejected outwardly through the space openings into the subsoil of the area being irrigated. The use of buried pipes for subsoil irrigation is expensive and sometimes can be unreliable due to the pipes becoming damaged or obstructions developing therein which will prevent an effective flow of water as would be required for subsoil irrigation.

SUMMARY OF THE INVENTION

The above disadvantages of the prior art irrigation systems have been overcome by the present invention which basically includes a translatable vehicle means having a plurality of horizontally spaced soil splitting shank means. The translatable vehicle means is adapted to be progressively maneuvered over an area to be irrigated in alternate, adjacent parallel paths of movement, with water used for irrigation being pumped through reelable conduit means from a stationary water supply source to pressure pumping means located on the translatable vehicle means. The water is delivered from the pressure pumping means through conduit means operatively associated with each of the soil splitting shank means and is ejected into the subsoil of the area through openings located adjacent the lower portions of the soil splitting shank means.

A modification of the soil splitting shank means comprises wedge-shaped members laterally projecting from the shank adjacent the tip portion. The conduit means are connected along the rear portion of the wedge members and terminate in openings adjacent the sides of the members, thereby directing water in close proximity to the roots of the particular crop.

An important feature of the present invention includes a second translatable vehicle means which has supported thereon a reel means. The reel means of the second translatable vehicle means is operatively connected to the first translatable vehicle by a reelable conduit element which is controlled from the second translatable vehicle means in a reeling operation to permit the first translatable vehicle means to maneuver in the plurality of alternate parallel paths of movement to cover the desired area. The second translatable vehicle reel means is connected by a first reelable conduit means to a stationary reel means located adjacent to the stationary water supply source.

The objects and advantages of the details of construction will become apparent after reading the following description of the illustrative embodiments with reference to the attached drawings wherein like reference numerals have been used to refer to like parts throughout the several figures, and wherein:

BRIEF DESCRIPTION OF THE FIGURES OF DRAWINGS

FIG. 5 is a vertical sectional view taken transversely through the fluid applying apparatus shown in FIG. 4, with certain parts omitted and certain parts broken away and shown in section for purpose of clarity;

FIG. 6 is an enlarged fragmentary sectional view taken along line 6—6 of FIG. 5, with certain parts omitted for purpose of clarity;

FIG. 7 is an enlarged fragmentary vertical sectional view showing one of the releasable latch means for supporting and latching the adjustable conduit means of the fluid applying apparatus;

FIG. 8 is a vertical sectional view taken along line 8—8 of FIG. 7;

FIG. 10 is an exploded perspective view of a modification of the soil splitting shank means;

FIG. 11 is a rear elevational cross-sectional view of the modified invention in its working environment;

FIG. 12 is a side elevational cross sectional view of FIG. 11; and,

FIG. 13 is a bottom plan view of the wing portion of the modified invention as taken along line 13—13 in FIG. 12.

DESCRIPTION OF THE ILLUSTRATIVE EMBODIMENTS

Figure 1:
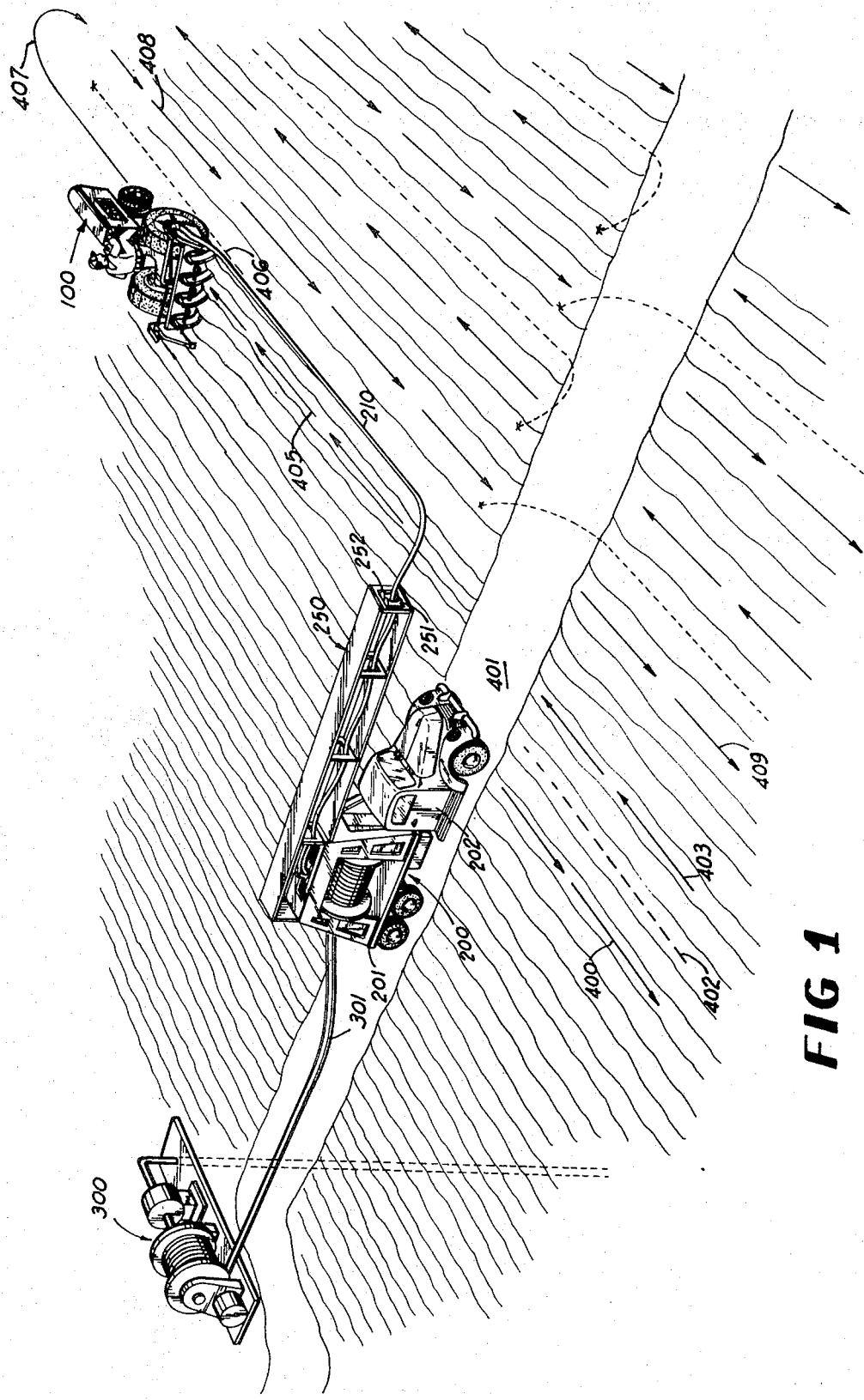
FIG. 1 is a perspective view showing a stationary fluid supply source, translatable reel means and translatable fluid applying apparatus operatively connected to each other to form a system for carrying out the principles of the present invention.

Referring now to the drawings, the present invention as depicted in FIGS. 1 – 9 will be described with reference to a translatable fluid applying apparatus 100, a translatable reel means 200 and a stationary fluid supply means 300.

The function of the translatable fluid applying apparatus 100 is to provide a fluid application means adapted to be supported on a translatable vehicle means for use in applying a fluid soil conditioning medium, such as water, to the subsoil of a predetermined area in response to a traversing movement of the fluid application means over the predetermined area.

The function of the translatable reel means 200 is to provide reel means adapted to be supported on a translatable vehicle means with the reel means being operative for controlling the reeling and unreeling operation of a pair of conduit portions and wherein the conduit portions are operative for delivering a fluid soil conditioning medium from the stationary supply source 300 to the translatable fluid applying apparatus 100.

The function of the stationary fluid supply source 300 is to provide a source of fluid which can be delivered by pressure pumping means through reelable conduit means to the fluid applying apparatus 100.

Figure 3:
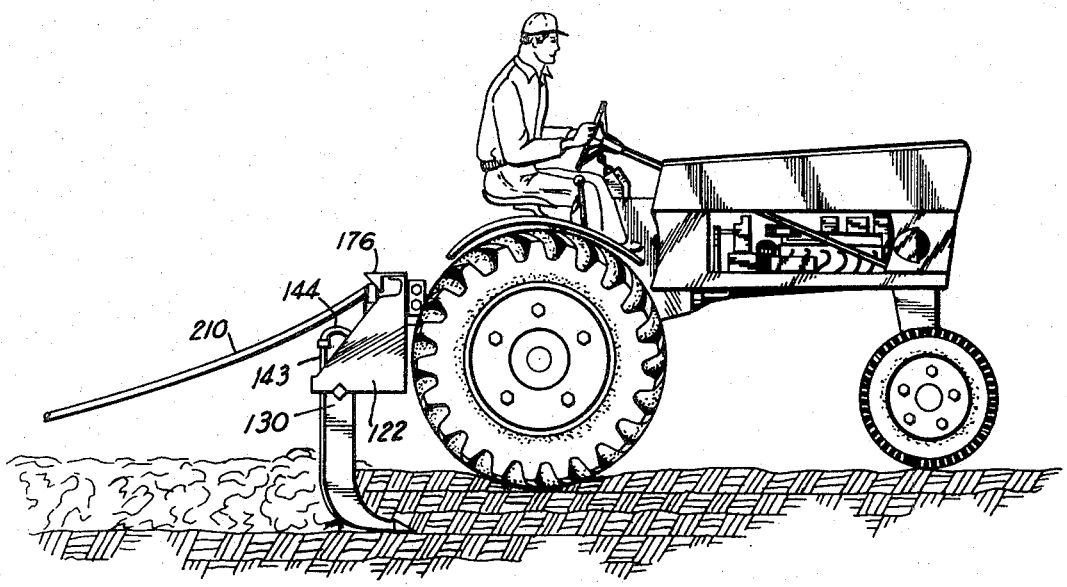
FIG. 3 is an elevational side view of a translatable vehicle means carrying the fluid applying apparatus.
Figure 4:
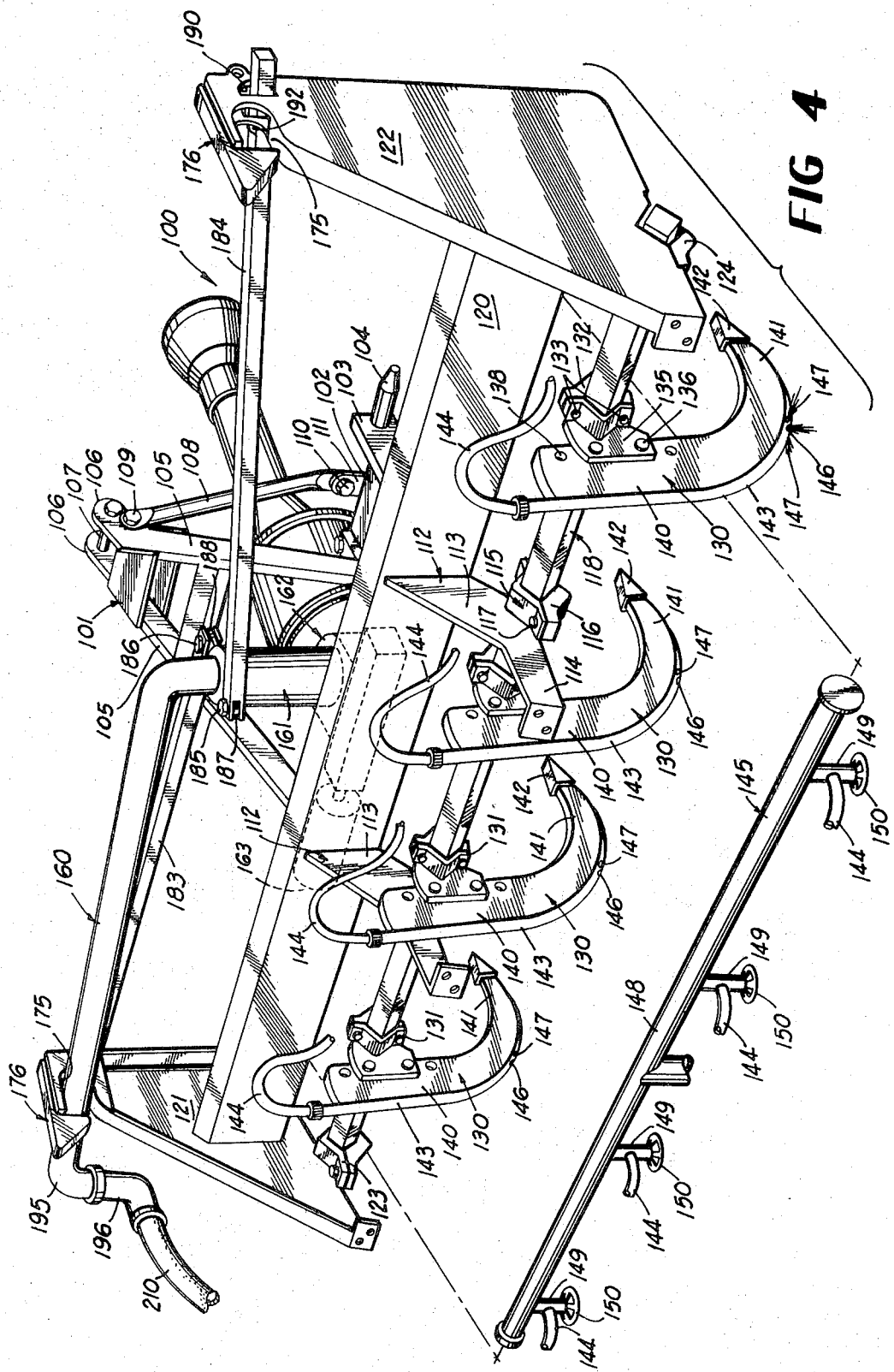
FIG. 4 is an enlarged exploded perspective view of the fluid applying apparatus shown in FIG. 3.

Referring now particularly to FIGS. 3-8, the translatable fluid application apparatus 100 includes a frame support means generally represented by the reference numeral 101. As shown in FIGS. 4 and 5, the frame support means includes a base supporting plate means 102. Connected along opposite lateral side edges of base plate 102 are a pair of fore and aft arranged vertically oriented plate elements 103, only one of which is shown in FIG. 4 (however, it is to be understood that a duplicate plate element 103 would be provided on the left side of plate member 102). The forward end of the plate elements 103 are provided with coaxially arranged laterally extending connecting pins 104. The connecting pins 104 are adapted to be releasably secured to the bottom links of a conventional three-point linkage system provided to the translatable vehicle. A pair of forwardly converging vertically inclined plate elements 105 are connected to the rear edge of base plate 102 adjacent opposite lateral side edges thereof by conventional means, such as welding (not shown). The forwardly converging plate elements 105 terminate into a pair of spaced, parallel arranged, forwardly extending portions 106. The forwardly extending portions 106 provide a support for a connecting pin 107. Connecting pin 107 is provided for releasable connection to the upper link of the above mentioned conventional three-point linkage system.

As shown in FIGS. 4 and 5, a pair of bracing link means 108 are connected between the base plate 102 and forwardly converging upwardly inclined plate elements 105. Only one of the bracing links 108 is shown in FIG. 4; however, it is to be understood that a similar bracing link 108 would be provided on the left side of the framework support means. The bracing link 108 is connected to the forwardly converging plate element 105 by a conventional threaded connecting bolt 109 adjacent an upper end thereof and is connected to the base plate 102 by a conventional threaded connecting bolt 110. The connecting bolt 110 is secured within an upstanding tab portion 111. Tab portion 111 is welded in a vertically oriented position adjacent the forward edge of base plate 102.

As shown in FIGS. 4 and 5, a pair of horizontally spaced rearwardly extending support brackets 112 are secured to the rear edge of the base plate 102 and plate elements 103. The frame support brackets 112 are secured to the base plates 102 and frame elements 103 by conventional means, such as welding (not shown). Each of the frame support brackets 112 includes a downwardly angled portion 113 and a horizontally extending portion 114. A supporting clamp 115 is secured to the lower edge of each of the support brackets 112 on the outside lateral side edges thereof. The supporting clamps 115 are secured to the support brackets 112 by conventional means, such as welding. Each of the supporting clamps 115 includes a clamping element 116 adapted to be adjustably secured to the supporting clamp 115 by means of conventional threaded connecting means 117. The clamp elements 115, 116 are detailed to define therebetween a substantially rectangular opening adapted to receive a conventional rectangular-shaped tool bar support member 118.

A horizontally extending angle plate member 120 is connected to the frame work support means 101 adjacent the rear edge of the base support plate member 102. The horizontally extending plate 120 extends laterally outward a predetermined distance on opposite sides of the plate support brackets 112. Secured to the opposite ends of the angle plate member 120 is a pair of vertically oriented housing members 121, 122. Each of the housing members 121, 122 has secured thereto adjacent a lower edge thereof conventional clamping members 123, 124. The clamping members 123, 124 define substantially rectangular openings extending therethrough which are complementary to the tool bar support member 118. The clamping members 123, 124 are adapted to be adjustably clamped to the tool bar 118 by conventional threaded connecting means (not shown).

As shown in FIG. 4, a plurality of soil splitting shank members 130 are secured in horizontally spaced relationship to the tool bar support means 118. The soil splitting shank members 130 are secured to the tool bar support means 118 by respective clamping members 131. Each of the clamping members 131 include a first clamping element 132 and a second clamping element 133. The two clamping members 132, 133 define a substantially rectangular opening extending therethrough which is complementary to the tool bar member 118. The clamping elements 132, 133 are clamped in a set position on the tool bar support member 118 by threaded connecting members 134. Extending rearwardly from the clamp support element 133 is a vertically oriented plate element 135 having a plurality of openings formed therein. The soil splitting shank member 130 is secured to the vertical plate element 135 by conventional threaded connecting means 136 which are adapted to be inserted through the openings in the plate element 135 and through aligned vertically spaced openings 138 in the soil splitting shank member 130. The vertically spaced openings 138 will permit vertical adjustment of the soil splitting shank member 130 relative to the supporting plate 135 in order to penetrate the soil at selected depths.

As shown in FIGS. 3–5, the soil splitting shank members 130 include a substantially vertically oriented portion 140 and a forwardly curved tip portion 141. The forward edge of curved tip portion 141 is provided with a conventional replaceable cutting tip 142. Fixed to the rear edge of each of the soil splitting shank members 130 is a conduit member 143. The conduit members 143 extend vertically upward along the rear edge of the soil splitting shank members 130 and are connected by a branch supply line 144 to a dispensing manifold 145. The dispensing manifold 145 will be described in more detail hereinbelow. A plurality of openings are formed in the conduit member 143 adjacent the lower edge thereof. The openings include a rearwardly extending opening 146 and a pair of laterally extending openings 147. The openings 146, 147 are adapted to dispense water or other suitable fluid therethrough into the openings in the subsoil of an area made by the soil splitting shank members 130.

As shown in FIG. 4, the dispensing manifold 145 is constructed of an elongated conduit member 148 having a plurality of fluid dispensing valve members 149 depending therefrom. The valve members 149 are connected to the branch supply lines 144 for transferring fluid therethrough to the conduit members 143. The valve members 149 include a conventional adjustable control 150 which will permit the valve members 149 to be moved from an open position to a plurality of adjusted positions or to a completely closed position. Thus, various combinations of the valve members 149 can be operable at any one time for dispensing fluid therethrough to a combination of the soil splitting shank members 130.

As shown in FIG. 5, the dispensing manifold 145 is secured to the lower surface of the mounting plate 102 by conventional U-bolt connection 151. Fluid is delivered to the dispensing manifold 145 by a supply conduit 152. The supply conduit 152 is in flow communication with the dispensing manifold 145 adjacent one end and is in flow communication with a conventional pressure 155 adjacent an opposite end. The pump 155 is adapted to be driven in a conventional manner for developing pressure on fluid introduced thereto by a conventional power take-off drive 156. The power take-off drive 156 is adapted to be connected to a conventional power producing drive means of the translatable vehicle whereby the pressure pump means 155 can be operated for developing pressure on fluid introduced thereto and for delivering the fluid under pressure to the supply conduit 152 and into the dispensing manifold 145. The pressure pump 155 is supported in a notched-out area provided in the horizontal support plate member 102 and is secured in a set position relative to plate 102 by a number of conventional threaded connecting means 157.

As shown in FIGS. 4 and 5, input supply fluid is introduced to the pressure pump 155 by a conduit member 158. Fluid is introduced into the supply conduit 158 through an angularly adjustable input supply line 160. The input supply line 160 is connected in fluid flow hermetically sealed relationship relative to the supply conduit 158. The supply conduit 160 is adapted to be angularly adjusted through approximately 180° relative to the frame support means 101 whereby the input supply conduit 160 can be selectively moved from a position extending laterally outward adjacent one side edge of the frame support means to a position extending laterally outward on the opposite side of the frame support means. The input supply conduit 160 is supported in hermetically sealed relationship within an adjustable collar 161.

As shown in FIGS. 4 and 6, collar 161 is supported for rotary movement within an actuating assembly 162. Actuating assembly 162 is supported on the upper surface of horizontal support plate member 102, as shown in FIG. 5. The actuating assembly 162 includes a conventional hydraulic cylinder 163. Cylinder 163 is connected adjacent its base end 164 to the support frame work at 165. Cylinder 163 includes a conventional reciprocally operable piston rod 166 having its extended end connected to a reciprocating rack member 167. Rack member 167 is supported for reciprocating movement within an elongated housing element 168. Rack 167 includes a series of gear teeth 169 supported for meshing relationship with a spur gear 170. Spur gear 170 is fixed to the adjustable collar 161 adjacent a lower portion thereof. Operation of the hydraulic cylinder 163 is controlled by conventional hydraulic supply means provided on the translatable vehicle and will furnish a supply of fluid operating pressure through the supply lines 171 for effecting a reciprocating movement of rack member 169 which will effect a corresponding rotation of the gear 170 and adjustable collar 161. As shown in FIG. 6, conventional lubricating means 172 is provided adjacent one end of the housing 168 for lubricating the reciprocating rack member 167 and spur gear drive means.

The reciprocating rack 167 and spur gear 170 are detailed in driving relationship such that with the cylinder 163 in a retracted position, as shown in FIG. 6, the collar 161 will be adjusted to the position shown in FIG. 4 with the input supply conduit 160 extending to the left lateral side of the support frame means 101. Movement of the hydraulic cylinder 163 to an extended position will effect a translating movement of the rack member 167 rightward within the support housing 168. Movement of the rack member 167 rightward will effect a counter-clockwise rotation of the gear 170 and adjustable collar 161. A counterclockwise movement of the collar 161 will rotate the input supply conduit 160 from the leftward extending position, as shown in FIG. 4, to a rightward extending position, as shown in FIG. 1.

The extent of movement of the rack 167 and gear 170 is detailed for effecting approximately 180° rotation of the collar 161. As shown in FIG. 6, the adjustable collar 161 includes an inwardly directed arcuate slot 173 which is in engagement with a radially extending key member 174 provided on the input supply conduit 160. The dimensions of the slot 173 and key member 174 are detailed for allowing a limited relative movement between the collar 161 and the input supply conduit 160 for the purpose of unlatching releasable latch means as will be described hereinbelow.

As shown in FIGS. 4, 5 and 7, the input supply conduit 160 is supported in the two above indicated laterally adjusted positions within rearwardly directed notches 175 formed on the upper edge of the frame work housing members 121, 122. The rearwardly directed notches 175 are detailed for receiving and supporting the input supply conduit 160 when moved to the two laterally adjusted positions. The conduit 160 is secured in a latched position within the rearwardly directed notches 175 by a releasable latch element 176.

As shown in FIG. 7, the releasable latch element 176 is pivotally supported about a horizontal pivot 177 for movement between a lower limit latch position, as shown in solid lines of FIG. 7 and an upward latch releasing position, as shown in dotted lines in FIG. 7. The latch element 176 is provided with a forward edge having an angularly disposed camming surface 178. Formed intermediate the latch element 176 is a downwardly opened latching recess 179. The latching recess 179 is detailed in dimensions for receiving and retaining the input supply conduit 160 therein when the latching element is in the downward limit position. As shown in FIGS. 4 and 7, the housing members 121, 122 are provided with upwardly angled surface 180 which cooperates with the downwardly angled surface 178 of the latching elements 176 to provide converging surface portions which will act as cam members. The angled surface portion 180 of the housing will contact and effect a camming movement of the conduit 160 into the rearwardly directed notch portion 175. Movement of the conduit 160 into the rearwardly directed notches 175 will contact the angled surface 178 of the latching element 176 to thereby cam the latch 176 to the upwardly displaced non-latching position, to permit the conduit to enter the rearwardly directed notch 175.

In order to effect a release of the latch elements 176 during adjusting movement of the collar 161, a pair of elongated latch releasing link members 183, 184 are provided for effecting movement of the latch elements 176 from their latched positions to their unlatched positions. The elongated link members 183, 184 are connected adjacent one end and by pivot connecting means 185, 186 to radially extending brackets 187, 188 formed on an upper edge of the collar 161. An opposite end of the links 183, 184 are slidably supported within laterally extending openings 189 (FIG. 5) and 190 (FIGS. 4 and 7) provided in housing members 121, 122. Each of the elongated latch releasing link members 183, 184 is provided with a cam element 191, 192, respectively. Links 183, 184 with cam members 191, 192 are detailed in supported relationship whereby a reciprocating movement of the links 183, 184 will effect a camming engagement of the cam elements 191, 192 with a bottom surface portion of the latch elements 186, to effect pivotal movement of the latch elements 176 from their lower latched positions, as shown in solid lines in FIG. 7, to their upward latch releasing positions, as shown in dotted lines in FIG. 7. A rotary adjusting movement of collar 161 will automatically effect a reciprocating movement of the latch releasing link members 183, 184 to effect a camming displacement of the latch elements 176 to their released positions. The relative motion connection between the inwardly directing arcuate slot 173 and key 174 of the adjusting collar and conduit element 160 will permit the latch releasing links 183, 184 to effect movement of the latch elements 176 to their latch releasing position before initiating a swinging movement of the input supply conduit 160 from one lateral extending position to an opposite lateral extending position.

The input supply conduit 160 includes a downwardly turned end portion 195 which has supported thereon a pivotally mounted swivel elbow connection 196. The elbow connection 196 is adapted to be connected to reelable conduit means as will be described in more detail hereinbelow. The swivel elbow 196 is hermetically sealed relative to the downwardly turned conduit portion 195, but will permit pivotal movement relative thereto during a swinging movement of the input supply conduit 160 from one laterally extending position to an opposite laterally extending position.

The method of operating the above described fluid application apparatus will be described in more detail hereinbelow in the description of the operation of the system embodying the principles of the present invention.

Figure 9:
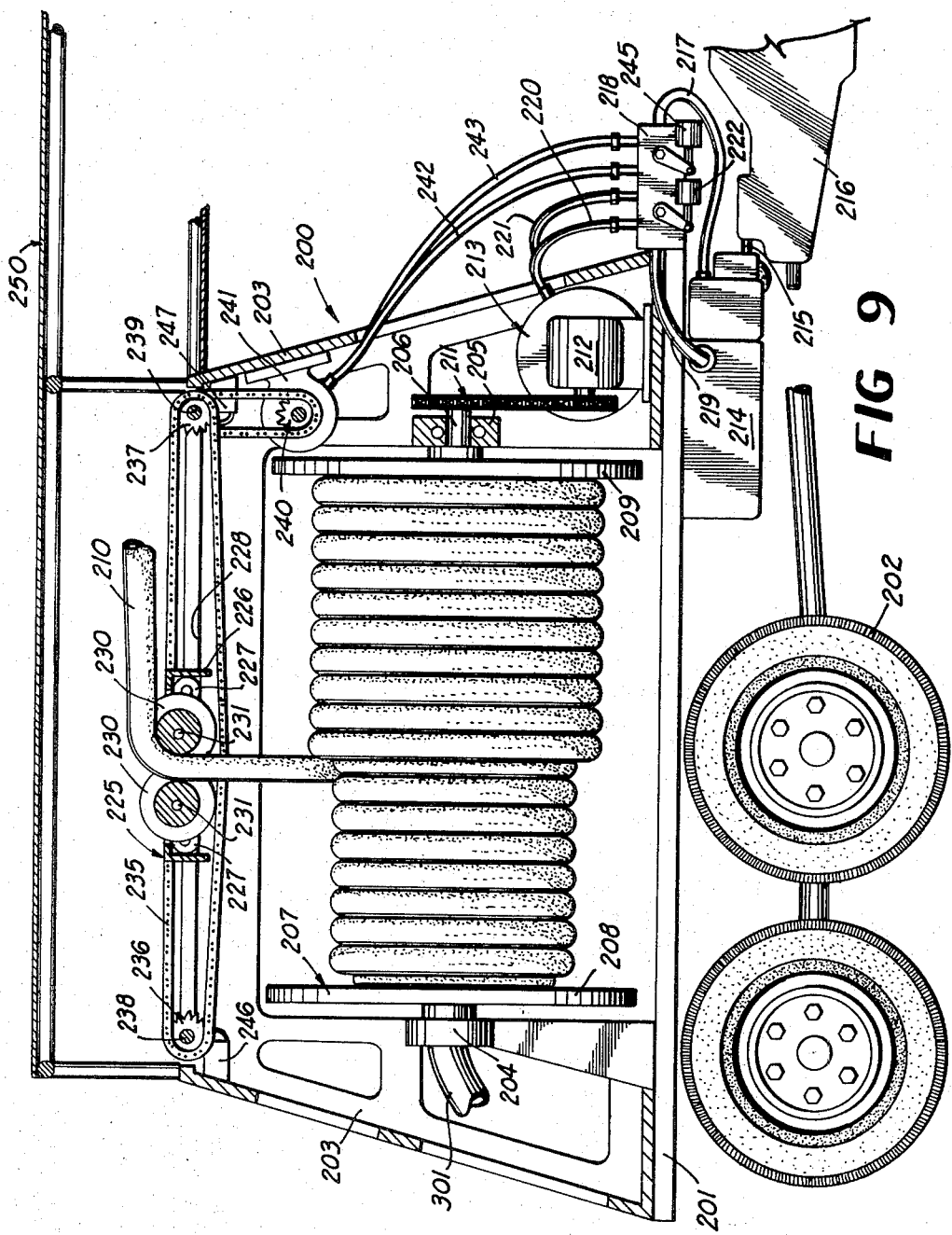
FIG. 9 is an enlarged fragmentary vertical sectional view taken longitudinally through the translatable reel means shown in FIGS. 1 and 2, with certain parts being omitted and certain parts broken away and shown in section for the purpose of clarity.

Referring now particularly to FIGS. 1 and 9, the translatable reel means 200 is adapted to be supported on the bed 201 of a conventional truck vehicle means 202. Reel means 200 includes a supporting framework 203 which provides a pair of coaxially aligned bearing support members 204, 205. The bearing support members 204, 205 are detailed for supporting shaft 206 of a reel spool element 207. The reel spool element 207 includes a conventional drum portion (not shown) and a pair of axially spaced radially extended flanges 208, 209. The reel drum portion and flanges 208, 209 are adapted to reelably support a conduit portion 210. Rotary movement of the reel 207 is provided by means of a chain and sprocket drive means 211 which is operatively connected to a gear box drive means 212. The gear box drive means 212 is driven by a conventional hydraulic motor drive means 213. Hydraulic motor drive means 213 is controlled by a conventional hydraulic pump means 214 supported on an underside of the vehicle bed means 201. The hydraulic pump means 214 is driven by a power take-off drive member 215 from the vehicle transmission means 216. The hydraulic pump means 214 includes a high pressure line 217 which is connected with a valve control assembly 218 and includes a return line 219 which is in communication with the valve assembly 218 and the hydraulic pump means 214 for returning the supply of hydraulic fluid to reservoir means (not shown) associated with the hydraulic pump means 214. Hydraulic fluid is delivered from the valve assembly 218 along supply lines 220, 221 to the reversible hydraulic motor 213. A solenoid control valve means 222 is provided on the valve assembly 218 for effecting a reversing operation of the rotary hydraulic motor 213 which will in turn effect a reversing movement of the reel means 207.

As shown in FIG. 9, the supply conduit 210 is supported for tracking movement above the reel means 207 by a carriage assembly 225. The carriage assembly 225 includes a supporting framework 226 having a number of support wheel means 227 rotatably supported thereon and detailed for rolling engagement with track means 228 provided on the reel supporting framework 203. The carriage assembly 225 includes a pair of roller guide elements 230 supported for rolling movement about spaced, parallel arranged axis 231. The roller guide elements 230 are formed with a shaped surface which will retain the conduit 210 therebetween but will permit movement of the conduit 210 relative thereto in a reeling and unreeling operation of the reel assembly 207. The carriage assembly 225 is provided for controlling the axial windup of the conduit 210 on the reel assembly 207, whereby the conduit 210 will be wound around the drum throughout the axial dimensions of the drum and will be permitted to unwind therefrom. The carriage assembly 225 will be moved axially above the reel means 207 along a path substantially parallel to the axis of the drum. Movement of the carriage assembly 225 is effected by a chain member 235 which is supported adjacent one end of the reel frame means 203 by a first sprocket 236 and is supported adjacent an opposite end by a sprocket member 237. The sprockets 236, 237 are supported for rotary movement about a cross support shaft 238, 239. The cross support shafts 238, 239 are rotatably supported on the framework 203 by conventional bearing means (not shown).

As shown in FIG. 9, a rotary movement of sprocket 237 is effected by a means of a sprocket and chain drive assembly 240. The sprocket and chain drive assembly 240 is rotated by means of a conventional reversible hydraulic motor means 241. The hydraulic motor means 241 is controlled by means of a pair of fluid hydraulic supply lines 242, 243 which are operatively connected to the valve assembly 218. The hydraulic motor drive means 241 is operable for driving the sprocket 237 in either a clockwise or counterclockwise direction to control a reciprocating movement of the carriage assembly 225 above the surface of the reel means 207. The hydraulic motor drive means 241 is controlled by a solenoid actuated valve control means 245. The solenoid operated valve control means 245 is operated by a pair of limit switches 246, 247. Limit 246, 247 are supported on the reel framework means 203 in a position to be contacted by movement of the carriage assembly 225. Movement of the carriage assembly 225 to the extreme leftward position will contact the limit switch 246 which will effect an operation of the solenoid control valve means 245 to thereby reverse the direction of drive from the hydraulic motor 241. Movement of the carriage assembly 225 to the extreme rightward position will contact the limit switch means 247 which will again energize solenoid control valve means 245 to again reverse the direction of the hydraulic motor drive means 241.

As shown in FIGS. 1 and 9, the reel supporting framework 203 includes an elongated boom support structure 250. The elongated boom support structure 250 includes a forwardly extending end which extends above and in front of the truck vehicle means 202. The forwardly extended end of the boom structure 250 is provided with a pair of roller guide elements 251, 252.

As shown in FIG. 4, the extended end of the reel supply conduit 210 is connected to the swivel connecting member 196 of the fluid application apparatus. An input supply into the reel assembly 207 is provided through a supply conduit 301. The input supply conduit 301 is extended axially into the reel assembly 207 and is connected in fluid flow communication with the conduit 210 in a conventional manner whereby fluid can be pumped through the supply conduit 301 and outwardly through the supply conduit 210. The reeling and unreeling operation of the translatable reel means 200 will be described in more detail hereinbelow in the description of the operation of the system.

MODIFICATION

A modification of the soil splitting shank member 130 is depicted in FIGS. 10–13. As described above for shank member 130, the modified shank member 530 is secured to tool bar support member 118 by means of clamping members 132, 133 which are clamped in a set position on member 118 by threaded connecting members 134. Vertically oriented plate element 135 extends rearwardly from element 133 and has a plurality of openings therethrough. Shank member 530 is secured to plate element 135 by threaded connecting means 136 which are adapted to be inserted through the openings in element 135 and through the aligned openings 531 in member 530.

Shank member 530 includes a substantially vertically oriented upper portion 532 and a forwardly extending curved lower portion 533 which terminates in tip 535. A beveled edge 534 extends from tip 535 along the leading edge surface of lower portion 533 and onto a part of upper portion 532. A pair of soil splitting elements 536 laterally project from shank member 530 adjacent tip 535. Elements 536 are wedges in the shape of swept-back wings with the thin edges 537 extending forwardly. The bottoms of elements 536 form a flat, contiguous surface.

Conduit member 538 extends along the rear edge of shank member 530 and is connected to dispensing manifold 145 as described above for conduit member 143 on shank member 130. As seen in FIG. 13, conduit member 538 is in flow communication with pipe 539 which is connected along the rear edges of elements and which terminates in openings 540. Openings 540 are inset from the side edges 541 of elements 536.

The shank members 530 are spaced along tool bar 118 so as to be positioned between adjacent rows of crops, as depicted in FIG. 11.

OPERATION

Figure 2:
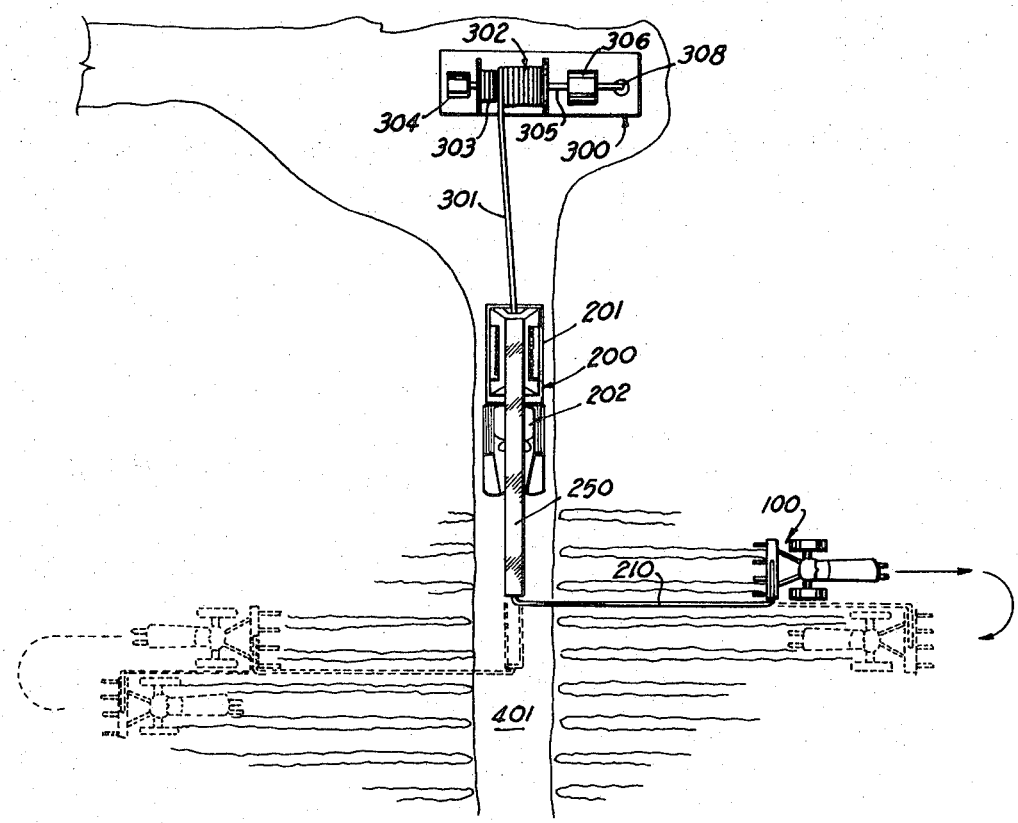
FIG. 2 is a horizontal schematic view of an area in which a subsoil application is to be made illustrating the paths of movement of the fluid applying apparatus relative to a given area.

As shown in FIGS. 1 and 2, the input supply conduit 301 is connected to a stationary reel assembly 302. The stationary reel assembly 302 includes a conventional reel drum 303 for reeling and unreeling the supply conduit 301. Rotary movement of the reel drum 303 is controlled by a conventional motor drive means 304. A supply of fluid is directed to the reel assembly 302 by a supply conduit portion 305. The supply conduit portion 305 is connected to a conventional pump 306. Fluid is supplied to the pump 306 from a conventional drilled well 308. The well 308 will supply a quantity of water to the pump 306 which will force the water under pressure through the supply conduit 305 outwardly through the supply conduit 301 into the translatable reel assembly 200. The water will then pass through the reel assembly supply conduit 210 and will be delivered by the conduit 210 through the input supply conduit 160 to the pressure pump 155. The water is delivered to the pressure pump 155 and will be increased in pressure and delivered through conduit 152 into the dispensing manifold 145. Water under pressure in the dispensing manifold 145 will then be directed along the branch supply conduits 144 to the conduit members 143 supported on the rear or trailing edge of the soil splitting shank members 130. Water entering the conduit portions 143 under pressure will be ejected outwardly through the openings 145, 147 into openings formed in the soil by the soil splitting shank member 130.

Referring now particularly to FIGS. 1 and 2, the above described fluid applying apparatus 100, translatable reel means 200 and stationary water supply source 300, can be utilized to carry out the method of irrigation embodying the principles of the present invention by traversing the area in which the subsoil irrigation is to be made. The traversing operation of the area in which the subsoil irrigation is to be made will follow a pattern of alternate parallel arranged paths of movement with each subsequent path of movement being adjacent a proceeding path of movement. As shown in FIG. 1, the first path of movement of the fluid application apparatus is represented by a series of solid arrow lines 400 which extend from the left of a vehicle roadway means 401. Movement of the fluid application apparatus 100 along the path of arrows 400 are detailed such that the supply conduit 210 will follow the path of the dotted lines 402. After the fluid application apparatus 100 has reached the end of the path of movement 400, the vehicle will be maneuvered through a 180° steering operation to cause the vehicle to move along an alternate path arranged parallel to path 400. The alternate path is represented by a series of arrows 403. During a steering movement of the fluid application apparatus from the path 400 to the path 403, the fluid input supply conduit 210 will cause the swivel connection 196 to rotate through approximately 180° relative to the downwardly turned elbow portion 195 of the input supply conduit 160. During a traversing operation of the fluid application apparatus along the path represented by arrows 403, the supply conduits 210 will remain located in the paths represented by the dotted lines 402. As the translating fluid application apparatus moves in the direction of the roadway 401, the translatable reel assembly 200 will effect a reeling operation of the conduit 210 to progressively shorten the conduit and to keep the conduit reeled up as the fluid application apparatus approaches the roadway. During movement of the translatable fluid application apparatus 100 along path 400, the soil splitting shank members 130 are lowered into position in engagement with the ground by conventional lift control means associated with the three point linkage of a supporting vehicle. In a lowered position, as shown in FIG. 3, the soil splitting shank members 130 will make a corresponding number of openings in the soil whereby the water pumped under pressure through the conduit means as described above can be ejected through openings 146, 147 into the openings made in the soil.

The soil splitting shank members 130 will be elevated to a position above the ground during a steering movement of the translatable fluid application apparatus from the path 400 to the path 403. After the fluid application apparatus approaches the roadway 401, the soil splitting shank members 130 will again be adjusted to an elevated position above the ground and the translatable fluid application apparatus 100 will move across to an opposite side of the roadway 401 and will again lower the soil splitting shank members 130 into engagement with the ground and will progress along a path represented by arrows 405. However, during movement of the fluid application apparatus across the roadway 401, the hydraulic control cylinder 163 will be operated to effect a swinging movement of the input supply conduit 160 from the leftward extended position shown in FIG. 4 to a rightward extended position shown in FIG. 1. As the fluid application apparatus progresses outwardly along path 405, the supply conduit 210 will be allowed to unreel from the reel assembly 207 and will track along a path represented by dotted lines 406.

After the fluid application apparatus reaches the end of path 405, the soil splitting shank members 130 will be elevated to a position above the ground and the vehicle will be maneuvered through a 180° steering movement represented by circular arrow 407, which will position the translatable fluid application apparatus for movement along an alternate path 408. Path 408 will be adjacent to and substantially parallel to path 405.

During a steering movement of the translatable fluid application apparatus 100 from path 405 to path 408, the input supply conduit 210 will again rotate about swivel connection 196 which will allow the conduit 210 to remain in the path represented by dotted lines 406. As the fluid application apparatus 100 progresses along path 408, the reel assembly 207 supported on the translatable reel means 200 will again be operated to progressively shorten the length of conduit 210 during a leftward movement of the translatable fluid application apparatus 100 along path 408.

As the translatable fluid application apparatus 100 approaches the roadway 401 along path 408, the soil splitting shank members 130 will again be elevated to a position above the ground and the support vehicle will progress across roadway 401 and lower the soil splitting shank members 130 again into engagement with the ground and will progress along a path represented by arrows 409. During movement of the translatable fluid application apparatus across roadway 401, the hydraulic control cylinder 163 will again be energized to effect a swinging movement of the input supply conduit 160 from the rightward extending position to the leftward extending position to allow the supply conduit to track along the path represented by dotted lines 410. During each of the swinging movements of the input supply conduit 160 by the control cylinder 163, the translatable vehicle 202 will be moved forward a distance corresponding to the space between the above indicated alternate paths of movement. The translatable reel assembly will be detailed in location to allow the forward edge of the boom guide roller means 151, 152 to be positioned in substantial alignment with the tracking path of the conduit member 210. The maneuvering of the fluid application apparatus 100 and translatable reel support means 200 will take a cooperative operation on the part of the operator of each of the vehicles.

As the operator of the translatable fluid application apparatus 100 continues to traverse the area in which the subsoil irrigation is to be made, the apparatus 100 will follow a number of alternate paths of movement with each path of movement being adjacent a preceding path of movement and with the paths of movement being substantially parallel to each other. The operator of the fluid application apparatus 100 will continue the traversing of the area until the number of alternate paths of movement have collectively covered the entire area in which a subsoil irrigation is to be made.

During the forward movement of the translatable reel means 200 the conduit member 301 will be unreeled from the reel assembly 303. The reel assembly 303 can either be controlled by an operator located at the stationary reel assembly 300 or can be controlled remotely by the operator of the translatable reel means 200.

After the translatable reel means 200 has reached the end of the roadway 401 in a subsoil irrigation operation, the translatable reel conduit means 210 can be disconnected from the swivel connection 196 and reeled inwardly. Simultaneously with the inward reeling of conduit 210, the conduit 301 can be disconnected from the translatable reel means 200 and reeled inwardly on the reel assembly 303. After the area adjacent the stationary well supply source 300 has been irrigated, as described above, the translatable reel means 200 and translatable fluid application apparatus 100 can be moved to additional areas to be irrigated and the translatable reel assembly and fluid application apparatus can be again connected to each other and connected to an additional stationary supply source for irrigating still another area in a manner as described hereinabove.

Referring now particularly to FIG. 2, in a subsoil irrigation of an area in a manner as described above, the translatable reel assembly will move in a first direction along the roadway 401 to reel the supply conduit portion 301 from the stationary reel assembly 303. As the translatable reel assembly 200 progresses along the roadway 401, the translatable fluid application apparatus 100 will move in a number of alternate paths of movement parallel arranged relative to each other, with the paths of movement being collectively operable for covering the entire area in which a subsoil irrigation is to be made. Movement of the fluid application apparatus in a subsoil irrigation operation will cause the supply conduit portion 210 of the translatable reel assembly 200 to move along a path angularly disposed relative to supply conduit 301 and angularly disposed to the roadway 401.

As shown in FIG. 2, a movement of the fluid application apparatus 100 about a 180° steering movement will cause the fluid application apparatus to pivot relative to the supply conduit 210 about the vertical axis of the swivel connecting member 196, which vertical axis is substantially aligned with the path of movement of the conduit member 210 and will thus allow the conduit 210 to remain in the same path for reeling in during an alternate path of movement of the fluid application apparatus.

OPERATION OF MODIFICATION

The operation of modified shank member 530 is similar to the operation of shank member 130. Water enters conduit member 538 from branch supply conduit 144 and is ejected outwardly through openings 540 into the opening formed in the soil by the soil splitting shank member 530.

As seen in FIG. 11, member 530 forms an inverted T-shaped trench through the middle of each furrow. The beveled edge 535 aids in the penetration of the soil, as do elements 536. The design of member 530 enables the water to be directed through openings 540 at the roots of the particular plants located on each side of the trench. The openings 540 are inset from edges 541 so as to prevent their being clogged by soil. Member 530 enables less water to be pumped through the apparatus 100 than by shank member 130 since the water is oriented directly at the root system.

The embodiments of the present invention have been described for performing subsoil irrigation in which a supply of water is pumped from a stationary well means 308 through a translatable reel means 200 and to a translatable fluid apparatus 100. However, it is to be understood that the above described system and method of operation could be utilized for pumping fluid fertilizer or other soil conditioning medium from a stationary supply source to a translatable fluid application apparatus.

It now becomes apparent that the above described embodiments of the present invention are capable of obtaining the above stated objects and advantages. It is obvious that those skilled in the art may make modifications in the details of construction without departing

What is claimed is:

1. A fluid application apparatus adapted to be supported on a translatable vehicle for use in applying a fluid soil conditioning medium to the subsoil of a predetermined area comprising, in combination:
   a. frame support means adapted to be carried by translatable vehicle means;
   b. means carried by said frame support means for making openings in the soil of an area in which a subsoil application is to be made in response to a traversing operation of said vehicle and frame support means;
   c. means carried by said frame support means for applying fluid through said openings into the subsoil of said area; and
   d. fluid input conduit means carried on said frame support means, said input conduit means being operable for delivering fluid therethrough from a stationary fluid supply means, said fluid input conduit means including a horizontal portion, pivot means located midway between the sides of said frame support means mounting said horizontal portion for swinging movement through an angle of 180°, said horizontal portion being of a length approximately equal to one-half the width of said frame support means, so that the end of said horizontal portion opposite the pivot means may be swung from a position adjacent one side of the frame support means to a position adjacent the other side thereof, means connecting said horizontal portion at its pivoted end in flow communication to said means for making openings in the soil, and flexible conduit means connected to said end of the horizontal portion opposite the pivot means for establishing flow connection to a fluid supply source.

2. A fluid application apparatus as claimed in claim 1 wherein said means for making openings in the subsoil includes a plurality of horizontally spaced means operable for simultaneously making a plurality of openings in said soil during said traversing operation.

3. A fluid application apparatus as claimed in claim 1 wherein said means for making said openings in said soil includes a plurality of horizontally spaced soil splitting shank means supported on said frame support means.

4. A fluid application apparatus as claimed in claim 3 wherein said soil splitting shank means includes conduit means thereon for conveying said fluid through the openings in the soil and operable for ejecting said fluid into the subsoil of said area being traversed.

5. A fluid application apparatus as claimed in claim 1 wherein said fluid applying means includes pressure developing means operatively associated therewith for ejecting said fluid through said openings into the subsoil of said area being traversed.

6. Apparatus as in claim 1 further including latching means for holding said horizontal portion of said input conduit means in each of the positions in which an end of said input conduit means is adjacent one side of said frame support means.

7. Apparatus as in claim 6 including means for releasing said latching means and for swinging said horizontal portion of said input conduit means about its pivot.

8. Apparatus as in claim 7 including a hydraulic cylinder and piston having connections for actuating said releasing means and said swinging means, said connections including a lost-motion connection for causing the release of the latching means prior to the swinging of said input conduit means.

9. Apparatus as in claim 6 wherein said latching means includes a latch element pivoted for movement about a horizontal axis and having an inverted U-shaped notch adapted to embrace said horizontal portion of said input conduit means.

10. Apparatus as in claim 9 wherein said latch element is provided, at its end opposite the pivot, with an inclined surface positioned to be engaged by the horizontal portion of said input conduit means in its swinging movement, to lift the latch element so that said horizontal portion may pass under it and thereafter to allow the latch element to drop into a position in which said notch embraces said horizontal portion.

11. A fluid application apparatus adapted to be supported on a translatable vehicle for use in applying a fluid soil conditioning medium to the subsoil of a predetermined area comprising, in combination:
   a. frame support means adapted to be carried by translatable vehicle means;
   b. means carried by said frame support means for making openings in the soil of an area in which a subsoil application is to be made in response to a traversing operation of said vehicle and frame support means;
   c. means carried by said frame support means for applying fluid through said openings into the subsoil of said area; and
   d. fluid input conduit means carried on said frame support means, said input conduit means being operable for delivering fluid therethrough from a stationary fluid supply means, said fluid input conduit means including a horizontal portion, pivot means located midway between the sides of said frame support means mounting said horizontal portion for swinging movement through an angle of 180°, said horizontal portion being of a length approximately equal to one-half the width of said frame support means, so that the end of said horizontal portion opposite the pivot means may be swung from a position adjacent one side of the frame support means to a position adjacent the other side thereof, said horizontal portion being connected at its pivot end in flow communication to said means for making openings in the soil, fluid coupling swivel means connected to that end of said horizontal portion remote from said pivot means for defining a vertically pivoted fluid coupling element, and flexible conduit means connecting said fluid coupling element in flow communication with said stationary fluid supply means.

12. Apparatus as in claim 11 further including latching means for holding said horizontal portion of said input conduit means in each of the positions in which an end of said input conduit means is adjacent one side of said frame support means.

* * * * *